United States Patent
Klose et al.

(10) Patent No.: US 10,232,941 B2
(45) Date of Patent: Mar. 19, 2019

(54) DYNAMICALLY ADAPTING PRE-RECORDED ANNOUNCEMENTS

(71) Applicant: Airbus Operations GmbH, Hamburg (DE)

(72) Inventors: Peter Klose, Hamburg (DE); Sven-Olaf Berkhahn, Hamburg (DE); Michael Luedtke, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 15/704,265

(22) Filed: Sep. 14, 2017

(65) Prior Publication Data

US 2018/0086465 A1   Mar. 29, 2018

(30) Foreign Application Priority Data

Sep. 23, 2016 (EP) .................................. 16190352

(51) Int. Cl.
| | | |
|---|---|---|
| *G08B 21/00* | (2006.01) | |
| *B64D 11/00* | (2006.01) | |
| *H04M 9/02* | (2006.01) | |
| *G08G 5/00* | (2006.01) | |
| *G10L 13/08* | (2013.01) | |
| *H04B 7/185* | (2006.01) | |

(52) U.S. Cl.
CPC ....... *B64D 11/0015* (2013.01); *G08G 5/0021* (2013.01); *G10L 13/08* (2013.01); *H04B 7/18506* (2013.01); *H04M 9/02* (2013.01)

(58) Field of Classification Search
CPC .................................. G06F 1/00; H04W 1/00
See application file for complete search history.

(56) References Cited

U.S. PATENT DOCUMENTS

| 6,335,694 B1* | 1/2002 | Beksa .................. G08G 5/0021 340/945 |
| 2003/0160706 A1* | 8/2003 | Endress ............. B64D 11/0015 340/945 |
| 2005/0278753 A1* | 12/2005 | Brady, Jr. ......... G06F 17/30861 725/76 |
| 2012/0140934 A1* | 6/2012 | Sherwood ............. H04R 29/00 381/56 |

FOREIGN PATENT DOCUMENTS

EP   0620697   10/1994

OTHER PUBLICATIONS

European Search Report, dated Feb. 24, 2017, priority document.

* cited by examiner

*Primary Examiner* — Shirley Lu
(74) *Attorney, Agent, or Firm* — Greer, Burns & Crain, Ltd.

(57) ABSTRACT

A method of providing an audio signal containing flight-related information to passengers on board the aircraft, a computer program product for carrying out such a method, an apparatus for providing an audio signal containing flight-related information to passengers on board an aircraft, and an aircraft comprising such an apparatus. A method embodiment comprises receiving a trigger to provide the audio signal, obtaining one or more predefined data fragments, obtaining flight-related information corresponding to a current flight of the aircraft, generating the audio signal based on the one or more predefined data fragments and the flight-related information, and providing the audio signal to one or more of the passengers on board the aircraft.

18 Claims, 2 Drawing Sheets

DYNAMICALLY ADAPTING PRE-RECORDED ANNOUNCEMENTS

CROSS-REFERENCES TO RELATED APPLICATIONS

This application claims the benefit of the European patent application No. 16 190 352.1 filed on Sep. 23, 2016, the entire disclosures of which are incorporated herein by way of reference.

BACKGROUND OF THE INVENTION

The present disclosure generally relates to the field of providing an audio signal containing flight-related information on board an aircraft. More particularly, the present invention relates to a method of providing an audio signal that is generated based on predefined data fragments and obtained flight-related information, to a computer program product for carrying out such a method, an apparatus for providing an audio signal containing flight-related information on board an aircraft, and to an aircraft comprising such an apparatus.

Several announcements are usually made on board an aircraft by aircraft personnel like flight attendants and pilots. For example, such announcements are made before or after take-off and landing, but also during flights when special situations like, e.g., turbulent flows arise. In general, two different types of announcements exist on board an aircraft, the first being pre-recorded announcements and the second being live announcements. Pre-recorded announcements are sometimes called Pre-Recorded Announcements and Music (PRAM) and live announcements are often called Passenger Address (PA) announcements. The announcements may contain, among other things, information on a current flight schedule, current flight altitude, current weather reports and weather forecasts at the destination airport, information on connecting flights and safety instructions for the passengers.

However, there sometimes arises the situation that the aircraft personnel are busy when such announcements, especially live announcements shall be provided for distributing certain information to the passengers on board the aircraft. Accordingly, such announcements may then distract the crew member making the announcement from his or her actual duty. Further, at least some of the announcements may be provided to the passengers with a time delay compared to the situation they are directed to. Thus, certain announcements may be no longer suited to the situation to which they refer.

Further, a certain announcement must often be provided in several languages, especially on international flights. This may lead to an unreasonably long time the pilot or the cabin crew has to spend on making the announcements, resulting in a further distraction of the respective cabin crew member from his or her conventional duties.

If many announcements are to be made in many different languages, the cabin crew might have the wish to be relieved from spending lots of time making announcements to the passengers on board the aircraft.

Accordingly, there is a need for a technique to at least partly generate and provide announcements to the passengers on board an aircraft in an automatized manner.

SUMMARY OF THE INVENTION

According to a first aspect, a method of providing an audio signal containing flight-related information to passengers on board an aircraft is provided. The method comprises receiving a trigger to provide the audio signal, obtaining one or more predefined data fragments, obtaining flight-related information corresponding to a current flight of the aircraft, generating the audio signal based on the one or more predefined data fragments and the flight-related information, and providing the audio signal to one or more of the passengers on board the aircraft.

The one or more predefined data fragments may be a pre-recorded announcement (PRAM) or any parts of such a PRAM. The PRAM may be stored on a memory card or any other suited storage medium on board the aircraft.

The flight-related information may comprise any data that is substantially related to an actual flight of the aircraft. The flight-related information may relate to any flight phase of the current flight. Alternatively or additionally, the flight-related information may relate to any special event that occurs during the flight.

The audio signal may be provided to the one or more of the passengers in multiple languages. For example, the audio signal may be provided to the one or more passengers in the official languages of the countries where the origin and destination airports reside. Additionally, the audio signal may be provided in the official language(s) of the country from which the operating airline originates and in any other desired language.

The audio signal may be provided to the one or more of the passengers on board the aircraft via loudspeakers installed in the aircraft. Alternatively or additionally, the audio signal may be provided to the one or more of the passengers on board the aircraft via an audio output unit of a terminal of an in-flight entertainment (IFE) system, such as a headphone and/or a loud speaker of the terminal. The terminal of the IFE system may be a terminal that is permanently mounted to the back of a seat or to any other suited location within the aircraft.

Receiving the trigger may comprise receiving an input via a flight attendant panel (FAP) on board the aircraft. The input may be a touch input to a touchscreen of the FAP carried out by any authorized crew member.

Receiving the trigger may further comprise receiving information on a special event related to the current flight of the aircraft. Such a special event may be detected and signaled by any suited system on board the aircraft and may include depressurization of the cabin or any certain emergency situation.

The trigger may indicate a specific subset of the flight-related information, and obtaining the flight-related information may comprise obtaining information corresponding to the specific subset of the flight-related information. By way of example and not limitation, if the flight-related information includes information on a destination airport, actual weather conditions at the destination airport as well as connecting flights, the information corresponding to the specific subset of the flight-related information may include information on connecting flights.

The flight-related information may be obtained from aircraft systems and/or from communication systems via a ground link or a satellite link. The aircraft systems may include speed, altitude, temperature, pressure as well as any other suited sensing systems installed on board the aircraft. The communication systems may include the internet and an aircraft communications addressing and reporting system or any other suited system for providing information to systems on board the aircraft.

The generating step may comprise generating text data by combining the one or more predefined data fragments and the flight-related information, and generating the audio signal via speech synthesis of the generated text data. In this case, the one or more predefined data fragments and the flight-related information may both be obtained as text data portions. That is, the one or more predefined data fragments and the flight-related information may comprise text data like, e.g., syllables or words or phrases or sentences.

The one or more predefined data fragments and the flight-related information may comprise audio data. The generating step may comprise generating the audio signal by combining the one or more predefined data fragments and the flight-related information.

The one or more of the predefined data fragments or the flight-related information may comprise text data. The method may further comprise generating audio data from the text data prior to the combining of the one or more predefined data fragments and the flight-related information. The other of the one or more of the predefined data fragments or the flight-related information may comprise audio data.

Generating the audio signal may further comprise receiving editing information via the FAP, and editing the obtained one or more data fragments and/or the obtained flight-related information. A textual representation of the one or more predefined data fragments and/or of the flight-related information may be displayed on the touchscreen of the FAP. The editing information may be input by any authorized crew member via the touchscreen of the FAP.

Editing the obtained information may comprise at least one of adding, modifying or deleting at least parts of the predefined data fragments and/or the flight-related information.

According to a second aspect, a computer program product is provided. The computer program product comprises program code portions for performing one or more of the steps of any of the method aspects described herein, when the computer program product is run or executed on a computer system or on one or more computing devices. The computer program product may be stored on a computer readable recording medium, such as a permanent or rewriteable memory, or may be downloadable as a signal.

According to a third aspect, an apparatus for providing an audio signal containing flight-related information to passengers on board an aircraft is provided. The apparatus comprises a receiving unit configured to receive a trigger to provide the audio signal, an obtaining unit configured to obtain one or more predefined data fragments and to obtain flight-related information corresponding to a current flight of the aircraft, a generating unit configured to generate the audio signal based on the one or more predefined data fragments and the flight-related information, and a providing unit configured to provide the audio signal to one or more of the passengers on board the aircraft.

According to a fourth aspect, an aircraft is provided. The aircraft comprises the apparatus as described herein.

All of the aspects described herein may be implemented by hardware circuitry and/or by software. Even if some of the aspects are described herein with respect to the apparatus, these aspects may also be implemented as a method or as a computer program for performing or executing the method. Likewise, aspects described as or with reference to a method may be realized by suitable components in the apparatus, or by means of the computer program.

BRIEF DESCRIPTION OF THE DRAWINGS

In the following, the present disclosure will further be described with reference to exemplary embodiments illustrated in the figures, in which.

DETAILED DESCRIPTION OF THE PREFERRED EMBODIMENTS

In the following description, for purposes of explanation and not limitation, specific details are set forth in order to provide a further understanding of the present disclosure. It will be apparent to one skilled in the art that the present disclosure may be practiced in other implementations that depart from the specific details described herein. For example, the specific types of announcements on board the aircraft mentioned below are just of exemplary nature and other announcement types may be used in a similar manner. Further, whenever it is referred to a passenger or an announcement in singular, it is conceivable that the pertaining part of the disclosure similarly embraces a plurality of passengers and/or announcements, and vice versa.

Those skilled in the art will further appreciate that functions explained herein below may be implemented using individual hardware circuitry, using software functioning in conjunction with a programmed microprocessor or a general-purpose computer, using an application specific integrated circuit (ASIC) and/or using one or more digital signal processors (DSPs). It will also be appreciated that when the present disclosure is described as a method, it may also be embodied in the device, a computer processor and a memory coupled to a processor, wherein the memory is encoded with one or more programs that perform the methods disclosed herein when executed by the processor.

Figure 1:
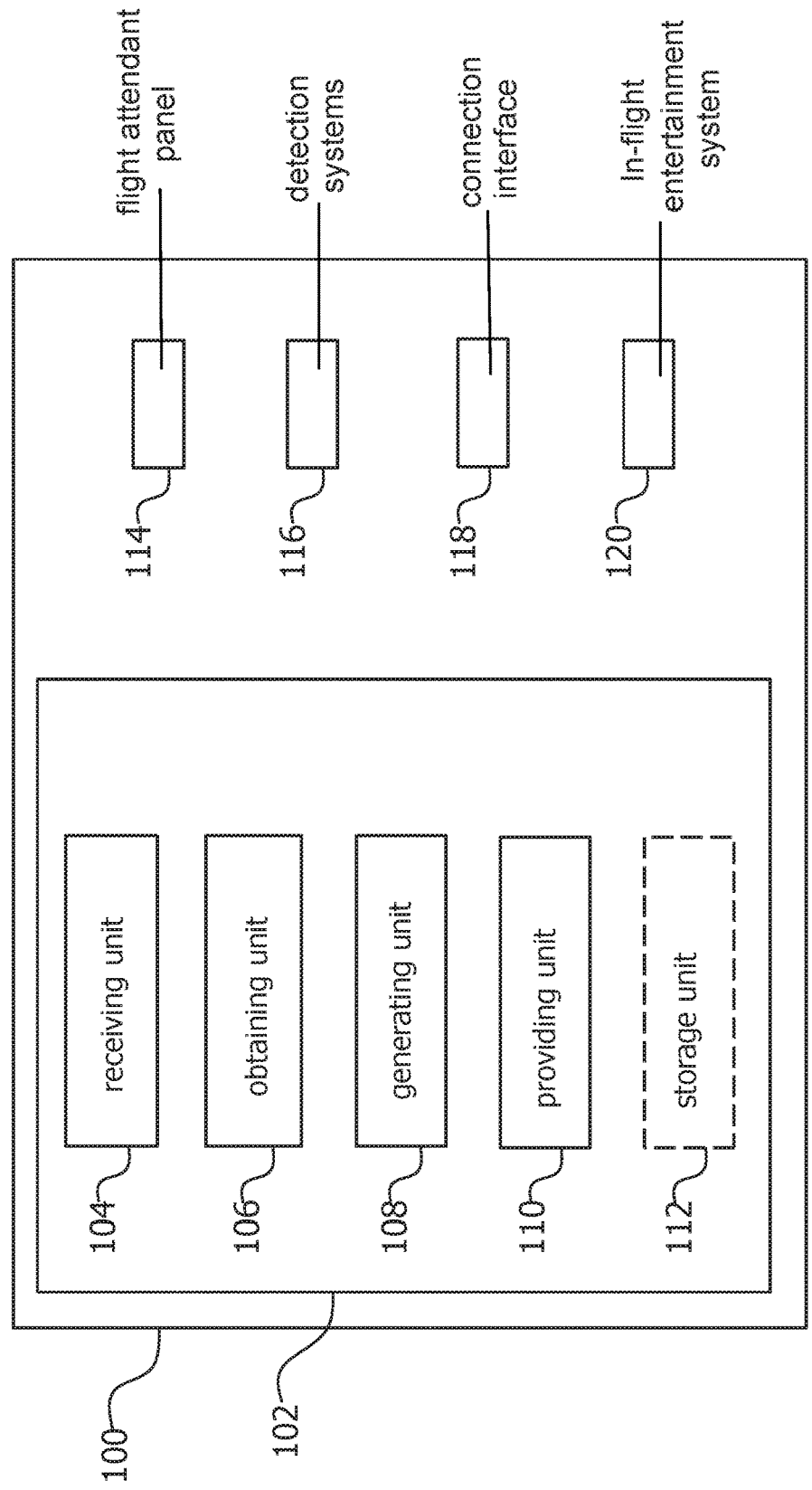
FIG. 1 schematically illustrates an apparatus embodiment on board an aircraft.

FIG. 1 schematically illustrates an exemplary embodiment of an apparatus 102 for providing an audio signal including flight-related information to passengers on board an aircraft 100. The provision of the audio signal may constitute an announcement to the passengers on board the aircraft 100 for several purposes during certain phases of a flight. That is, whenever it is referred to a current or actual flight in the context of this disclosure, any phase of flight from a first passenger entering the aircraft at an origin airport to a last passenger disembarking the aircraft at a destination airport is embraced.

The apparatus 102 comprises a receiving unit 104, an obtaining unit 106, a generating unit 108 and a providing unit 110. Further, the apparatus 102 may comprise a storage unit 112. Although the storage unit 112 is shown in FIG. 1 as being part of the apparatus 102, the storage unit 112 may equally be arranged outside the apparatus 102. In such a case, the apparatus 102 may store and retrieve data from the storage unit 112 arranged outside the apparatus 102.

The storage unit 112 may be permanently arranged on board the aircraft. For example, the storage unit 112 may be installed on board the aircraft and may be part of a Cabin Intercommunication Data System (CIDS) or a FAP 114 or may be a memory card attached to the CIDS or the FAP.

The receiving unit 104 of the apparatus is configured to receive a trigger to provide the audio signal. For example, an input to a touchscreen of the FAP 114 made by the pilot of the aircraft 100 may constitute such a trigger.

The obtaining unit 106 is configured to obtain one or more predefined data fragments. The predefined data fragments may be obtained from the storage unit 112 via suited signaling means. The data fragments may be obtained in text data format and/or in audio data format and may contain snippets representing language such as syllables, words, phrases as well as parts of or complete sentences. Data fragments having audio data format may contain snippets that were pre-recorded before the flight or during the current flight via suited recording means and subsequently stored in the storage unit 112. Data fragments having text data format may contain snippets that were retrieved from a suited database or any other storage medium in or outside the aircraft 100 and subsequently stored in the storage unit 112.

Further, the obtaining unit 106 is configured to obtain flight-related information corresponding to a current flight of the aircraft 100. Similar to the data fragments, the flight-related information may be obtained in text data format and/or in audio data format and may contain snippets representing language such as syllables, words, phrases as well as parts of or complete sentences.

The flight-related information may be obtained from detection systems 116 installed on board the aircraft 100. Such detection systems 116 may comprise sensors and other detection means. Additionally, the flight-related information may be obtained from communication systems like the internet or the aircraft communications addressing and reporting system. The apparatus 102 may be connected to such communication systems via a connection interface 118 on board the aircraft 100.

The flight-related information may contain information like origin and destination airport, departure time, flight time, estimated time of arrival, flight speed, flight altitude, heading etc. Further, the flight-related information may contain weather reports and forecasts at the destination airport, parking gate and terminal information at the destination airport as well as information on connecting flights.

The generating unit 108 is configured to generate the audio signal to be provided to the passengers of the aircraft 100 based on the one or more predefined data fragments and the flight-related information. The providing unit 110 is configured to provide the audio signal to one or more of the passenger on board the aircraft 100.

The aircraft 100 may further comprise an IFE system 120 having one or more terminals that are fixedly arranged inside the aircraft, e.g., at the rear of passenger seats and/or in the hallway of the aircraft 100. Loudspeakers of such terminals may be used to provide the audio signal to the passengers.

Figure 2:
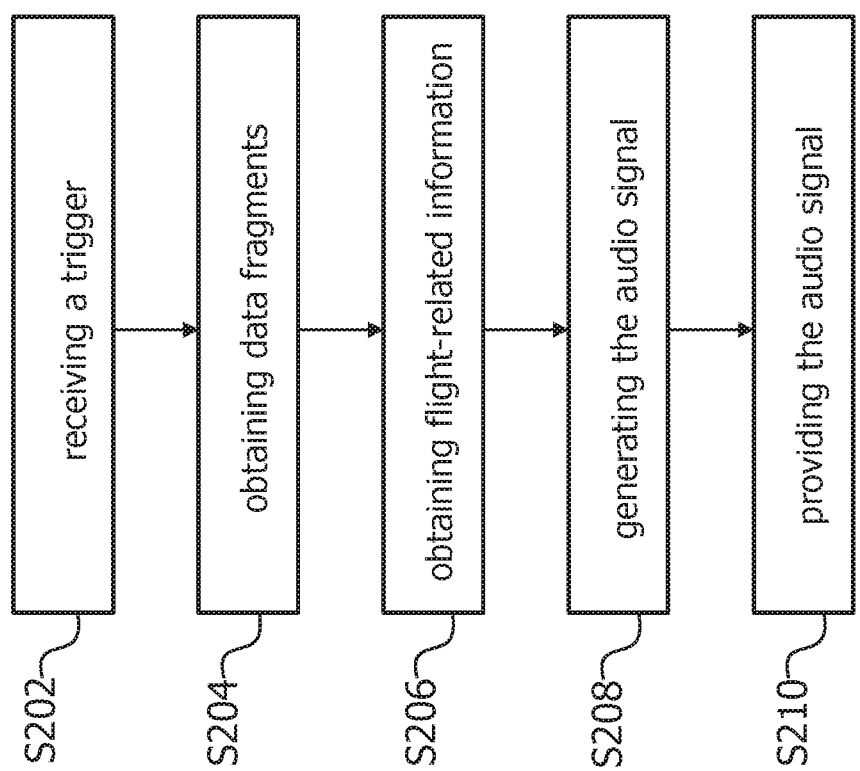
FIG. 2 schematically illustrates a flow chart of a method embodiment which may be performed by the apparatus of FIG. 1.

FIG. 2 schematically illustrates a flow chart of a method which may be performed by the apparatus 102. Thus, further details regarding the operation of the apparatus 102 will be described in the following with reference to both FIGS. 1 and 2.

In step S202, a trigger to provide an audio signal containing flight-related information to passengers on board the aircraft 100 is received by the receiving unit 104. In steps S204 and S206, one or more data fragments and flight-related information corresponding to a current flight of the aircraft 100 are obtained by the obtaining unit 106, respectively. In step S208, the audio signal is provided to one or more of the passengers on board the aircraft by the providing unit 110.

Further optional details regarding the apparatus 102 of FIG. 1 and the method of FIG. 2 are explained in the following.

The apparatus 102 may be integrated into or combined with—e.g., as a software or hardware component—one or more existing systems provided in the aircraft 100 and supplement these systems by providing the functionalities described herein that may be used to execute desired functions of these systems and/or extend the functionalities of these systems by adding additional functions. For example, the apparatus 102 may be integrated into or connected with a cabin management system of the aircraft 100 such as the CIDS. It will be understood that other implementations of the apparatus 102 are conceivable. For example, the apparatus 102 may be provided as a standalone unit that may communicate, for example via a network, with other systems or entities provided in the aircraft 100 and trigger execution of functions provided by these systems.

An announcement, e.g., a spoken text may be either provided live (e.g., through loudspeakers arranged in the aircraft 100) by the flight personnel or may be provided from tape. A pilot or another crew member may select among several pre-recorded announcements to be provided to the passengers of the aircraft 100. Such pre-recorded announcements may be limited to a certain number and may be stored in the storage unit 112. The limited announcements may be displayed on a touchscreen of the FAP 114 in form of a list and when one of the entries in the list is selected, the corresponding announcement is provided to the passengers.

Examples for such pre-recorded announcements may be a welcome message, a message containing security instructions, an informational message regarding flight conditions such as current weather, speed and altitude of the aircraft and any further information related to the current flight of the aircraft 100.

However, the method and apparatus provided by the present disclosure serve to combine such pre-recorded announcements as indicated above with actual information that is retrieved from different sources such as external communication systems or detection systems 116 installed on board the aircraft 100. As such, it is possible to dynamically adapt pre-recorded announcements or parts thereof to a current situation and to provide these adapted announcements to the passengers in an automatized manner.

When the pilot or another crew member selects an announcement or a specific type of announcement from the list at the touchscreen of the FAP 114, this denotes the reception of a trigger (step S202). Accordingly, the selected announcement shall be provided to the passengers in form of an audio signal. Another type of trigger may be a signal from one of the detection systems 116 on board the aircraft 100. For example, when a sensor configured to measure the cabin pressure signals a drop of the cabin pressure below a certain threshold, no interaction from the cabin crew is needed to trigger the provision of the audio signal.

After the trigger has been received, the obtaining unit (106) obtains predefined data fragments and flight-related information (steps S204 and S206). The sequence of steps S204 and S206 is not limited and may be equally carried out in reverse order. Either one of them or both the predefined data fragments and the flight-related information may be obtained in accordance with a specific subset of the flight-related information that shall be provided. This specific subset may be indicated by the trigger. Spoken in terms of the above indicated list on the touchscreen of the FAP 114, when the pilot selects a list entry named, e.g., "weather conditions at destination," this selection denotes the trigger to provide flight-related information corresponding to the specific subset that contains information on weather conditions at the destination airport.

That is, the trigger indicates that the audio signal to be provided is an announcement containing a weather report for the destination airport. Accordingly, the flight-related information will contain information such as temperature, humidity and other weather specific information. On the contrary, the flight-related information may not contain information on, e.g., an actual speed and altitude of the aircraft 100.

Similarly, the predefined data fragments may merely contain words or phrases that are useful in the context of the specific subset, such as "Current weather conditions," "destination airport," "cloudy," "rainy," "degree Celsius," etc. but may not contain words or phrases like "gate," "the connecting flight to," etc.

After obtaining the predefined data fragments and the flight-related information, the audio signal is generated based on the predefined data fragments and the flight-related information in step S208. The generating of the audio signal generally includes combining by, e.g., concatenating the one or more predefined data fragments and the flight-related information. The exact process of generating the audio signal may depend on the data form of the predefined data fragments and/or the flight-related information.

The predefined data fragments and the flight-related information may be obtained as audio data or as text data. Other data formats are contemplated but would usually be converted into audio data or text data prior to further processing.

In case both the predefined data fragments and the flight-related information are obtained as text data, the predefined data fragments and the flight-related information are combined. The audio signal is then generated from the resulting text data by means of speech synthesis. For example, the predefined data fragments may constitute a cloze. This cloze may then be combined with the flight-related information, i.e. the information corresponding to the current flight of the aircraft 100 is used to fill the gaps of the cloze. When the cloze is completed, an audio signal is generated therefrom by utilizing speech synthesis.

In case both the predefined data fragments and the flight-related information are obtained as audio data, the predefined data fragments and the flight-related information are combined to generate the audio signal. The combining may similarly include filling gaps (flight-related information) in a cloze (predefined data fragments). Alternatively, the combining may include concatenating the predefined data fragments and the flight-related information to generate the audio signal.

If one of the predefined data fragments and the flight-related information are obtained as audio data while the other of them is obtained as text data, the text data may be converted to audio data. Subsequently, combining of the predefined data fragments and the flight-related information is carried out as indicated above.

Prior to a conversion of text data to audio data or if both the predefined data fragments as well as the flight-related information are obtained as text data, text data may be edited. Editing of text data may be carried out before or after text data of the predefined data fragments and the flight-related information are combined. Editing of the predefined data fragments and/or the flight-related information may include adding, modifying or deleting text passages in the respective data.

For editing purposes, the resulting text data or portions thereof from which the audio signal is generated is displayed on the touchscreen of the FAP 114. The pilot or any other crew member can then pre-read the text that builds the basis for the audio signal and is then able to edit the respective text according to his or her wishes by applying touch inputs to the touchscreen of the FAP 114. The touch inputs are then processed by the generating unit 108 of the apparatus 102 in order to edit the currently displayed text. Further, it may be possible for the pilot or any other crew member to store the text that is actually displayed or parts thereof in the storage unit 112 for later use as a predefined data fragment.

In case a predefined data fragment or flight-related information that is obtained as audio data shall be edited, the respective data may first be converted to text data. The editing may then be carried out as described above. If the editing is finished or in case no editing is needed, the audio signal is generated as described above.

In step S210, the audio signal is provided to one or more of the passengers on board the aircraft 100. The providing may be carried out via loudspeakers of the terminals of the IFE system 120 of the aircraft 100 or via any other suited providing means.

Although throughout the present disclosure examples for the announcements, i.e., the provided audio signals are given in English language, it is conceivable that all announcements may be equally provided in multiple languages. For example, and not limitation, a certain announcement may be provided two or three or more consecutive times in two or three or more different languages, e.g., in English as well as in the official language or languages of the countries where the origin and destination airports are located. In such a case, the predefined data fragments and/or the flight-related information may be already obtained in the respective languages. Alternatively, the predefined data fragments and/or the flight-related information may be obtained in English or another language and translated to the respective language via suited processing means, e.g., by the generating unit 108 of the apparatus 102.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of providing an audio signal containing flight-related information to passengers on board an aircraft, wherein the method comprises:
receiving a trigger to provide the audio signal;
obtaining one or more predefined data fragments;
obtaining flight-related information corresponding to a current flight of the aircraft;
generating the audio signal based on the one or more predefined data fragments and the flight-related information; and providing the audio signal to one or more of the passengers on board the aircraft, wherein receiving the trigger comprises receiving an input via a flight attendant panel on board the aircraft.

2. The method of claim 1, wherein the trigger indicates a specific subset of the flight-related information and wherein obtaining the flight-related information comprises obtaining information corresponding to the specific subset of the flight-related information.

3. The method of claim 1, wherein the flight-related information is obtained from at least one of aircraft systems or communication systems via a ground link or a satellite link.

4. The method of claim 1, wherein the generating step comprises
generating text data by combining the one or more predefined data fragments and the flight-related information; and
generating the audio signal via speech synthesis of the generated text data.

5. The method of claim 1, wherein the one or more predefined data fragments and the flight-related information comprise audio data, and wherein the generating step comprises generating the audio signal by combining the one or more predefined data fragments and the flight-related information.

6. The method of claim 5, wherein the audio data contain snippets that were pre-recorded before the current flight.

7. The method of claim 5, wherein the audio data contain snippets that were pre-recorded during the current flight.

8. The method of claim 1, wherein the one or more of the predefined data fragments or the flight-related information comprise text data, and wherein the method further comprises generating audio data from the text data prior to the combining of the one or more predefined data fragments and the flight-related information.

9. The method of claim 1, wherein the one or more of the predefined data fragments and the flight-related information comprise text data and wherein the generating step further comprises
receiving editing information via the flight attendant panel; and
editing the obtained one or more data fragments.

10. The method of claim 9, wherein the editing the obtained information comprises at least one of adding, modifying or deleting at least parts of at least one of the predefined data fragments or the flight-related information.

11. The method of claim 1, wherein the flight-related information comprises weather reports for the destination airport.

12. The method of claim 1, wherein the flight-related information comprises a heading of the aircraft.

13. The method of claim 1, wherein the one or more of the predefined data fragments and the flight-related information comprise text data and wherein the generating step further comprises
receiving editing information via the flight attendant panel; and
editing the obtained flight-related information.

14. The method of claim 13, wherein the edited flight-related information is stored in a storage unit for later use as a predefined data fragment for generating the audio signal.

15. The method of claim 1, wherein the audio signal is provided to the one or more passengers on board the aircraft in at least two different languages according to the flight-related information.

16. A computer program product comprising:
a non-transitory computer readable medium having stored thereon executable program code portions for causing a computer system or one or more computing devices to perform the method of claim 1 when the executable program code portions are executed on the computer system or the one or more computing devices.

17. An apparatus for providing an audio signal containing flight-related information to passengers on board an aircraft, wherein the apparatus comprises:
a hardware receiving unit configured to receive a trigger via a flight attendant panel on board the aircraft to provide the audio signal;
a hardware obtaining unit configured to obtain one or more predefined data fragments and to obtain flight-related information corresponding to a current flight of the aircraft;
a hardware generating unit configured to generate the audio signal based on the one or more predefined data fragments and the flight-related information; and
a hardware providing unit configured to provide the audio signal to one or more of the passengers on board the aircraft.

18. An aircraft comprising the apparatus of claim 17.

* * * * *